United States Patent Office 3,641,007
Patented Feb. 8, 1972

3,641,007
UNSATURATED PREGNA-3,20-DIONE-
[17α,16α-d]-OXAZALINES
Giangiacomo Nathansohn, Milan, Gianfranco Odasso,
Cusano Milanino, and Pietro de Ruggieri and Umberto
Guzzi, Milan, Italy, assignors to Gruppo Lepetit S.p.A.,
Milan, Italy
No Drawing. Filed May 1, 1969, Ser. No. 821,150
Claims priority, application Italy, May 3, 1968,
16,028/68
Int. Cl. C07c 173/10
U.S. Cl. 260—239.55                     13 Claims

ABSTRACT OF THE DISCLOSURE

The invention relates to pregn-4-ene-3,20-dione-[17α,16α-d]-oxazolines, substituted or unsubstituted at positions 6 and 2', and wherein additional double bonds $\Delta^1$ and/or $\Delta^6$ may be present. Said compounds possess progestinic activity.

This invention is concerned with new progestinic agents. More particularly, the new substances with which this invention is concerned are steroids fused with an oxazoline ring, which possess the following generic structure

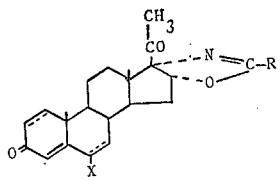

wherein R represents hydrogen, alkyl and aryl, X represents methyl, fluorine and chlorine, and, when a $\Delta^6$ is present, also hydrogen. The dotted lines in rings A and B indicate that a double bond may be present at position 1 and/or 6. It is apparent that when no double bond is present at position 6, the substituent may be present in one of the epimeric positions α and β.

The various steroido-oxazolines prepared in accordance with the present invention possess an unexpectedly high progestinic activity.

The compounds of our invention are prepared starting from a steroido-oxazoline, which is described in U.S. Pat. 3,413,286 and which is represented by the formula

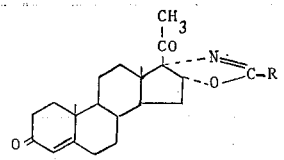

wherein R is hydrogen, alkyl or aryl, through a series of steps which may vary according to the substituent to be introduced into position 6 of the steroid molecule. For instance, when the 6-substituent must be a methyl group, the flow sheet of the preparation may be illustrated as follows:

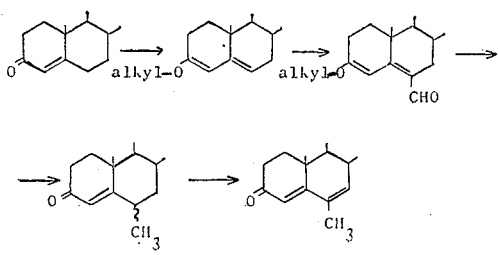

More in detail, the starting compound is dissolved in an organic solvent and reacted with a more or less important excess, preferably from 2 to 5 equimolecular amounts of a tri-lower alkyl orthoformate in the presence of p-toluenesulphonic acid. The 3,5 - diene - 3 - alkoxy-derivative obtained is then formylated at position 6 by means of phosgene in dimethylformamide and successively reduced to the 4-ene-6-methyl-steroid. For best results it is preferable to achieve this reductive step with cyclohexene in the presence of palladium on charcoal as the catalyst. The obtained steroid is then optionally converted into the corresponding 4,6-diene using as dehydrogenating agent an excess of a quinone such as chloranil.

Alternatively, when the 6-substituent must be a halogen, as for instance chlorine or fluorine, the flow sheet will be one of the following represented as sub (a) or (b):

(a)
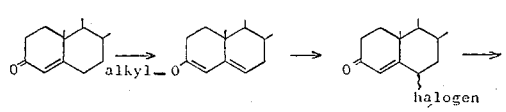

(b)
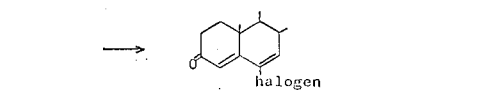

According to the process (a) the 3,5-diene-3-alkoxy-steroid is reacted with an agent capable of introducing the halogen atom at position 6, such as N-chlorosuccinimide or perchloryl fluoride, when respectively a chloro- or a fluoro-derivative is desired. An excess of these reactants is used, and the 4-ene-6β-halo-steroid is obtained generally in high yields. Sometimes a by-product, i.e. the 6α-isomer is formed in smaller amounts, dependently on the selected reactant and the reaction conditions. The 6β-form is then isomerized to the 6α-form by simply contacting the steroid, dissolved in a suitable solvent such as acetic acid, with hydrogen chloride. The dienization at position 6 is then optionally achieved, and can be carried out as described above when dealing with the preparation of the 6-methyl-steroids. Also in this last step of the process a by-product, consisting of the 1,4,6-triene of the following partial formula

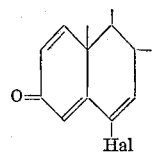

is sometimes observed. The method (b) comprises in the first stage a dienization with chloranil effected as illustrated above. Then the 4,6-diene is reacted with an over-equimolecular amount of monoperphthalic acid and the obtained 6,7-epoxide comprising both 6α,7α- and 6β,7β-forms, is contacted with a solution of hydrochloric or hydrofluoric acid in acetic acid. Only the 6α,7α-epoxide undergoes the conversion into the diene, while the β-form is discarded during the successive operations of purification of said final compound.

Other obvious variations may be found, which will run according to procedures well known in the art of steroid chemistry, without departing from the inventive limits of our invention.

While we give hereinafter some detailed working examples for the preparation of the new compounds, we may mention the following compounds which may be prepared and form part of our invention:

pregna-4,6-diene-3,20-dione-6-methyl-[17α,16α-d]-2'-methyloxazoline
pregna-4,6-diene-3,20-dione-6-methyl-[17α,16α-d]-2'-ethyloxazoline
pregna-4,6-diene-3,20-dione-6-methyl-[17α,16α-d]-2'-n-butyloxazoline
pregna-4,6-diene-3,20-dione-6-methyl-[17α,16α-d]-2'-tert-butyloxazoline
pregna-4,6-diene-3,20-dione-6-methyl-[17α,16α-d]-2'-pentyloxazoline
pregna-4,6-diene-3,20-dione-6-methyl-[17α,16α-d]-2'-phenyloxazoline
pregna-4,6-diene-3,20-dione-6-methyl-[17α,16α-d]-2'-propyloxazoline
pregna-1,4,6-triene-3,20-dione-6-methyl-[17α,16α-d]-2'-methyloxazoline
pregna-1,4,6-triene-3,20-dione-6-methyl-[17α,16α-d]-2'-ethyloxazoline
pregna-1,4,6-triene-3,20-dione-6-methyl-[17α,16α-d]-2'-propyloxazoline
pregna-1,4,6-triene-3,20-dione-6-methyl-[17α,16α-d]-2'-n-butyloxazoline
pregna-1,4,6-triene-3,20-dione-6-methyl-[17α,16α-d]-2'-tert-butyloxazoline
pregna-1,4,6-triene-3,20-dione-6-methyl-[17α,16α-d]-2'-n-pentyloxazoline
pregna-1,4,6-triene-3,20-dione-6-methyl-[17α,16α-d]-2'-phenyloxazoline
pregna-4,6-diene-3,20-dione-6-chloro-[17α,16α-d]-2'-methyloxazoline
pregna-4,6-diene-3,20-dione-6-chloro-[17α,16α-d]-2'-ethyloxazoline
pregna-4,6-diene-3,20-dione-6-chloro-[17α,16α-d]-2'-propyloxazoline
pregna-4,6-diene-3,20-dione-6-chloro-[17α,16α-d]-2'-n-butyloxazoline
pregna-4,6-diene-3,20-dione-6-chloro-[17α,16α-d]-2'-tert-butyloxazoline
pregna-4,6-diene-3,20-dione-6-chloro-[17α,16α-d]-2'-n-pentyloxazoline
pregna-4,6-diene-3,20-dione-6-chloro-[17α,16α-d]-2'-phenyloxazoline
pregna-1,4,6-triene-3,20-dione-6-chloro-[17α,16α-d]-2'-methyloxazoline
pregna-1,4,6-triene-3,20-dione-6-chloro-[17α,16α-d]-2'-ethyloxazoline
pregna-1,4,6-triene-3,20-dione-6-chloro-[17α,16α-d]-2'-propyloxazoline
pregna-1,4,6-triene-3,20-dione-6-chloro-[17α,16α-d]-2'-n-butyloxazoline
pregna-1,4,6-triene-3,20-dione-6-chloro-[17α,16α-d]-2'-tert-butyloxazoline
pregna-1,4,6-triene-3,20-dione-6-chloro-[17α,16α-d]-2'-n-pentyloxazoline
pregna-1,4,6-triene-3,20-dione-6-chloro-[17α,16α-d]-2'-phenyloxazoline
pregna-4,6-diene-3,20-dione-6-fluoro-[17α,16α-d]-2'-methyloxazoline
pregna-4,6-diene-3,20-dione-6-fluoro-[17α,16α-d]-2'-ethyloxazoline
pregna-4,6-diene-3,20-dione-6-fluoro-[17α,16α-d]-2'-propyloxazoline
pregna-4,6-diene-3,20-dione-6-fluoro-[17α,16α-d]-2'-n-butyloxazoline
pregna-4,6-diene-3,20-dione-6-fluoro-[17α,16α-d]-2'-tert-butyloxazoline
pregna-4,6-diene-3,20-dione-6-fluoro-[17α,16α-d]-2'-n-pentyloxazoline
pregna-4,6-diene-3,20-dione-6-fluoro-[17α,16α-d]-2'-phenyloxazoline
-pregn-4-ene-3,20-dione-6-methyl-[17α,16α-d]-2'-tert-butyloxazoline
-pregn-4-ene-3,20-dione-6-chloro-[17α,16α-d]-2'-tert-butyloxazoline
-pregn-4-ene-3,20-dione-6-fluoro-[17α,16α-d]-2'-tert-butyloxazoline
-pregn-4-ene-3,20-dione-6-methyl-[17α,16α-d]-2'-methyloxazoline
-pregn-4-ene-3,20-dione-6-chloro-[17α,16α-d]-2'-methyloxazoline
-pregn-4-ene-3,20-dione-6-fluoro-[17α,16α-d]-2'-methyloxazoline
-pregn-4-ene-3,20-dione-6-methyl-[17α,16α-d]-2'-phenyloxazoline
-pregn-4-ene-3,20-dione-6-chloro-[17α,16α-d]-2'-phenyloxazoline
-pregn-4-ene-3,20-dione-6-fluoro-[17α,16α-d]-2'-phenyloxazoline
-pregna-4,6-diene-3,20-dione-[17α,16α-d]-2'-methyloxazoline
-pregna-4,6-diene-3,20-dione-[17α,16α-d]-2'-ethyloxazoline
-pregna-4,6-diene-3,20-dione-[17α,16α-d]-2'-propyloxazoline
-pregna-4,6-diene-3,20-dione-[17α,16α-d]-2'-n-butyloxazoline
-pregna-4,6-diene-3,20-dione-[17α,16α-d]-2'-tert-butyloxazoline
-pregna-4,6-diene-3,20-dione-[17α,16α-d]-2'-n-pentyloxazoline
-pregna-4,6-diene-3,20-dione-[17α,16α-d]-2'-phenyloxazoline
pregna-1,4,6-triene-3,20-dione-6-fluoro-[17α,16α-d]-2'-methyloxazoline
pregna-1,4,6-triene-3,20-dione-6-fluoro-[17α,16α-d]-2'-butyloxazoline
pregna-1,4,6-triene-3,20-dione-6-fluoro-[17α,16α-d]-2'-phenyloxazoline As said above, the compounds of the invention show a therapeutically valuable progestional activity, which was evaluated through the well-known Clauberg-McPhail's test. The following Table 1 reports the results obtained for some representatives of the class by administering the drugs, to be tested, to estrogen-primed immature female rabbits by subcutaneous and oral route. The data are relative to progesterone, administered subcutaneously.

TABLE 1

| Compound | Relative potency (progesterone s.c.=1) | |
|---|---|---|
| | S.c. | Os |
| Pregn-4-ene-3,20-dione-6α-methyl-[17α,16α-d]-2'-methyloxazoline | 50 | 15 |
| Pregna-4,6-diene-3,20-dione-6-methyl-[17α,16α-d]-2'-methyloxazoline | 55 | 25 |
| Pregna-4,6-diene-3,20-dione-6-chloro-[17α,16α-d]-2'-methyloxazoline | 60 | 30 |

The claimed compounds display also a very high degree of anti-estrogenicity, which was evaluated in rats according to the Dorfman test (Dorfman et al.—Endocrinology 68, 17 (1960)). The following Table 2 reports the results obtained, relative, as in Table 1, to progesterone, administered subcutaneously.

Table 2

Compound: Relative potency (progesterone s.c.=1), s.c.

Pregna - 4,6 - diene - 3,20 - dione-6-methyl-[17α,16α-d]-2'-methyloxazoline _____ 16
Pregna - 4,6 - diene - 3,20 - dione-6-chloro-[17α,16α-d]-2'-methyloxazoline _____ 12
Pregna - 4,6 - diene - 3,20 - dione-6-chloro-[17α,16α-d]-2'-propyloxazoline _____ 22

In consideration of the above illustrated properties, the compounds of the invention may be usefully employed in the therapy of gynecological disorders and for contraceptive purposes.

The various steroids subject of the invention may be administered orally or parenterally. The active ingredient can be administered alone or associated with a carrier. Any carrier used in pharmaceutical praxis may be used, provided no incompatibility exists with the active ingredient. The pharmaceutical compositions may take the form of tablets, powders, capsules, elixirs, syrups or other dosage forms useful for oral ingestion. Alternatively, when the parenteral route is preferred, sterile liquid diluents are used, such as a solvent for the active ingredient.

Our invention is illustrated by the following examples.

EXAMPLE 1

Pregna-4,6-diene-3,20-dione-6-methyl-[17α,16α-d]-2'-methyloxazoline (a) A mixture of 10 g. of pregn-4-ene-3,20-dione-[17α,16α-d]-2'-methyloxazoline, 300 ml. of dioxane, 9 ml. of trimethyl orthoformate and 7.8 g. of 4-toluenesulfonic acid is stirred for 2 hours at room temperature, then it is poured into 2500 ml. of water containing 20 g. of sodium bicarbonate. Yield 9.6 g. of pregna-3,5-diene - 20 - one - 3 - methoxy-[17α,16α-d]-2'-methyloxazoline; M.P. 174–176° C.

(b) A solution of 58.2 ml. of dichloroethane containing 5.82 g. of phosgene is added at 0° C. to a solution of 8.5 g. of dimethylformamide in 35 ml. of dichloroethane. After stirring for 15 minutes, to the mixture there is added at 15–20° C. a solution of 8.5 g. of the above obtained steroido-oxazoline in 38.5 ml. of dichloroethane and 0.5 ml. of pyridine. After stirring for 4 hours at room temperature a solution of 11.55 g. of sodium acetate in 231 ml. of water is added, stirring is continued for some minutes and the mixture is extracted with diethyl ether. The organic extract is washed with water and the solvent evaporated in vacuo giving a residue formed mainly of pregna - 3,5 - diene-20-one-6-formyl-3-methoxy-[17α,16α-d] - 2 '- methyloxazoline which recrystallized from methanol, melts at 213–215° C., $[\alpha]_D^{20}$ −55° (c.=1 in CHCl$_3$).

(c) To a solution of 7 g. of the above 6-formyl derivative in 210 ml. of anhydrous ethanol, 21 g. of cyclohexene, 1.1 ml. of acetic acid and 1.55 g. of 10% palladium on charcoal are added. After refluxing for 4 hours, a second portion of 0.5 g. of 10% palladium on charcoal is added and the refluxing is continued for an additional hour. The mixture is filtered, the filtrate is evaporated to dryness in vacuo and the residue is dissolved in benzene and chromatographed on silicagel, eluting with benzene-acetone in increasing ratios. By evaporating in vacuo the fraction eluted with benzene:acetone 15:1, the residue is pregna - 4 - ene-3,20-dione-6α-methyl-[17α,16α-d]-2'-methyloxazoline, which on crystallization from diethyl ether-petroleum ether melts at 173–176° C. $[\alpha]_D^{20}$ +110° (c.=1 in CHCl$_3$).

(d) To a solution of 5 g. of the above 6α-methyl steroid in 100 ml. of anhydrous tert-butanol, 5 g. of tetrachloroquinone (chloranil) are added and the mixture is warmed at 60° C. for 24 hours in a nitrogen atmosphere. The excess chloranil is filtered off and the filtrate is evaporated in vacuo to dryness. The residue is taken up with 100 ml. of chloroform, some solids are filtered off, the solution is washed with aqueous sodium hydroxide and water and evaporated to dryness in vacuo. The residue is recrystallized from acetone-hexane. Yield 3.8 g. of pregna-4,6-diene-3,20-dione - 6 - methyl-[17α,16α-d]-2'-methyloxazoline. M.P. 213–5° C.; $[\alpha]_D^{20}$ +53° (c.=1 in CHCl$_3$).

EXAMPLE 2

Pregna-4,6-diene-3,20-dione-6-chloro-]17α,16α-d]-2'-methyloxazoline (a) A mixture of 2 g. of pregna-3,5(6)-diene-20-one-3-methoxy-[17α,16α-d]-methyloxazoline, prepared as described in paragraph (a) of Example 1. 70 ml. of acetone, 15 ml. of water and 2.8 g. of N-chlorosuccinimide is allowed to stand at room temperature for 36 hours, then the acetone is distilled off in vacuo and the mixture is diluted with water, Pregn-4-ene - 3,20 - dione-6β-chloro-[17α,16α-d]-2'-methyloxazoline which precipitates is collected, washed with water and dried. M.P. 103–5° C.; $[\alpha]_D^{20}$ +57° (c.=1 in CHCl$_3$).

(b) The obtained steroid is dissolved in 30 ml. of acetic acid and through this cooled solution a stream of hydrogen chloride is passed for 90 minutes. After stirring for 2.5 hours at room temperature, nitrogen is bubbled in to remove the excess hydrogen chloride, 30 ml. of a saturated water solution of sodium acetate are added and the mixture is extracted with chloroform. After washing with aqueous sodium bicarbonate and water, the solvent is evaporated in vacuo giving a residue which is dissolved in acetone and precipitated by the addition of hexane.

The thus obtained pregn-4-ene-3,20-dione-6α-chloro-[17α,16α-d]-2'-methyloxazoline melts at 187–189° C.; $[\alpha]_D^{20}$ 123° (c.=1 in CHCl$_3$).

(c) To a solution of 1 g. of the thus obtained pregn-4-ene - 3,20 - dione-6α-chloro-[17α,16α-d]-2'-methyloxazoline in 25 ml. of ethyl acetate, 2 g. of chloranil in 5 ml. of acetic acid are added. After refluxing for 10 hours in a nitrogen atmosphere, the solution is poured into 100 ml. of water. The mixture is extracted with ethyl acetate and the organic extract is washed with aqueous 10% sodium hydroxide and water. The solvent is evaporated to dryness and the residue recrystallized from diethyl ether. The crystalline product is pregna-4,6-diene-3,20-dione-6-chloro-[17α,16α-d]-2'-methyloxazoline. Yield 0.5 g. M.P. 241–5° C.; $[\alpha]_D^{20}$ 70° (c.=1 in CHCl$_3$). By chromatographing the mother liquors on alumina the pregna-1,4,6-triene - 3,20 - dione - 6-chloro-[17α,16α-d]-2'-methyloxazoline can be obtained. M.P. 230–2° C.; $[\alpha]_D^{20}$ −4° (c.=1 in CHCl$_3$).

EXAMPLE 3

This is an alternative route for preparing the compound of Example 2.

(a) To a solution of 3.75 g. of pregn-4-ene-3,20-dione-[17α,16α-d]-2'-methylovoazoline in 70 ml. of anhydrous butanol, 4 g. of chloranil are added, and the mixture is refluxed for 20 hours in a nitrogen atmosphere. After cooling the mixture is filtered, the filtrate is evaporated to dryness in vacuo, the residue is taken up with methylene dichloride and washed with aqueous 10% sodium hydroxide and water. The solvent is removed in vacuo and the residue is recrystallized from ethyl acetate, yielding 3 g. of pregna-4,6-diene-3,20-dione-[17α,16α-d]-2'-methyloxazoline. M.P. 210–2° C. $[\alpha]]_D^{20}$ +60° (c.=1 in CHCl$_3$).

(b) To this compound (3 g.), dissolved in 90 ml. of methylene dichloride, a solution of 5 g. of monoperphthalic acid in 100 ml. of diethyl ether is added. The progress of the reaction is followed in the U.V. spectrum through the disappearance of a maximum at 282 mμ and the appearance of a maximum at 240 mμ. After 50 hours the solution is washed with a saturated water solution of sodium bicarbonate and water and then it is evaporated to dryness in vacuo. There is obtained the raw pregn-4-ene - 3,20 - dione-6,7-epoxy-[17α,16α-d]-2'-methyloxazoline which is triturated with diethyl ether and crystallized from acetone.

(c) The epoxy compound (1 g.) is dissolved in 50 ml. of acetic acid and the solution is saturated with hydrogen chloride. After 6 hours at room temperature the solution is poured into 150 ml. of ice-water and adjusted to pH 6.0 by the addition of aqueous sodium carbonate. After 15 minutes the precipitate is collected, washed with water and crystallized from ethyl acetate-hexane.

EXAMPLE 4

Pregna-4,6-diene-3,20-dione-6-chloro-[17α,16α-d]-2′-phenyloxazoline (a) A mixture of 0.5 g. of pregn-4-ene-3,20-dione-[17α,16α-d]-2′-phenyloxazoline, 100 ml. of anhydrous benzene, 3 ml. of absolute ethanol, 5 ml. of triethyl orthoformate and 2.5 ml. of a 3% solution of hydrogen chloride in ethanol is heated at 70° C. for 2 hours. After cooling to room temperature, 5 ml. of pyridine are added, the solvent is distilled off in vacuo and the residue is taken up with water and filtered. The solid is dissolved in acetone, precipitated with water, and recrystallized from methanol. This is pregna-3,5-diene-20-dione-3-ethoxy-[17α,16α-d]-2′-phenyloxazoline. Yield 0.325 g.; M.P. 129–131° C.; $[\alpha]_D^{20}$ —159° (c.=1 in $CHCl_3$).

(b) A mixture of 1.2 g. of pregna-3,5-diene-3,20-dione-3-ethoxy-[17α,16α-d]-2′-phenyloxazoline, 60 ml. of actone, 12 ml. of water and 2.7 g. of N-chlorosuccinimide is allowed to stand 2 days at room temperature. The mixture is then poured into water, neutralized with 10% sodium hydroxide and the steroid extracted several times with methylene chloride. The combined organic extracts are washed with water, dried over sodium sulphate and concentrated to dryness in vacuo. The residue consisting of pregn - 4 - ene - 3,20 - dione-6β-chloro-[17α,16α-d]-2′-phenyloxazoline, is recrystallized from hexane. Yield 0.70 g.; M.P. 105–107° C. $[\alpha]_D^{20}$ +7° (c.=1 in $CHCl_3$).

(c) An amount of 0.6 g. of pregn-4-ene-3,20-dione-6β-chloro-[17α,16α-d]-2′-phenyloxazoline dissolved in 30 ml. of glacial acetic acid and 5 ml. of concentrated hydrochlorid acid is allowed to stand 4 hours at room temperature. The mixture is then diluted with water, neutralized with 10% sodium hydroxide, and the precipitated steroid collected by filtering and washed with water. The raw product can be purified by chromatographic route on silica gel column, using diethyl ether as the eluent. Yield 0.35 g. of pregn-4-ene-3,20-dione-6α-chloro-[17α,16α-d]-2′-phenyloxazoline. M.P. 137–140° C.; $[\alpha]_D^{20}$ +36° (c.=1 in $CHCl_3$).

(d) An amount of 0.5 g. of pregn-4-ene-3,20-dione-6α-chloro-[17α,16α-d]-2′-phenyloxazoline is dissolved in 25 ml. of anhydrous tert-butanol, 0.5 g. of chloranil are added and the solution is heated at 60° C. for 24 hours in a nitrogen atmosphere. The reaction mixture is allowed to cool, filtered and the filtrate concentrated to dryness. The residue is taken up with 50 ml. of chloroform, the insoluble filtered off, and the cholorform solution washed first with a 10% sodium hydroxide solution then with water to neutrality, and the solvent distilled off. A residue is obtained consisting of pregna-4,6-diene-3,20-dione-6-chloro-[17α, 16α-d]-2′-phenyloxazoline which is recrystallized from acetone-hexane. Yield 0.41 g.; M.P. 183–185° C.; $[\alpha]_D^{20}$ +8° (c.= 1 in $CHCL_3$).

EXAMPLE 5

Pregna-4,6-diene-3,20-dione-6-fluoro-[17α,16α-d]-2′-methyloxazoline (a) A stream of perchloryl fluoride is bubbled into 150 ml. of tetrahydrofuran at 10–15° C. until 3.5 g. are dissolved, then 10 g. of pregna-3,5-diene-3-methoxy-20-one-[17α,16α-d]-2′-methyloxazoline, prepared as described in Example 1, paragraph (a), dissolved in 50 ml. of tetrahydrofuran are slowly added during 10 minutes. At the same time a further amount of perchloryl fluoride is bubbled through the solution up to a total amount of 7 g. Then 50 ml. of water are added and the mixture is allowed to stand for 2.5 hours.

A stream of nitrogen is passed through the solution in order to remove the excess of perchloryl fluoride, then the solvent is evaporated off in vacuo, and the residue is washed with water, filtered and dried, to give 4.2 of a mixture of pregn - 4 - ene - 3,20-dione-6α (and 6β)-fluoro-[17α,16α-d]-2′-methyloxazoline.

(b) The mixture of the two epimers is dissolved in 40 ml. of acetic acid and a stream of hydrogen chloride is bubbled into the solution during 90 minutes at 15° C.

After 16 hours nitrogen is passed through it for 15 minutes, 40 ml. of a saturated aqueous solution of sodium acetate are added, and the steroid is extracted repeatedly with benzene. The combined benzene extracts are washed first with a sodium bicarbonate solution then with water to neutrality, and the solvent is distilled off. The residue is crystallized from acetone, giving 2.4 g. of pregn-4-ene-3,20 - dione - 6α - fluoro-[17α,16α-d]-2′-methyloxazoline. M.P. 214–216° C.; $[\alpha]_D^{20}$ +118° (c.=1 in $CHCl_3$).

(c) Starting from 2 g. of pregn-4-ene-3,20-dione-6α-fluoro-[17α,16α-d]-2′-methyloxazoline and working substantially as described in Example 1d, 1.6 g. of pregna-4,6-diene - 3,20 - dione - 6 - fluoro - [17α,16α-d] - 2′-methyloxazoline are obtained. M.P. 252–254° C.; $[\alpha]_D^{20}$ +65° (c.=1 in $CHCl_3$).

We claim:
1. A steroid of the formula

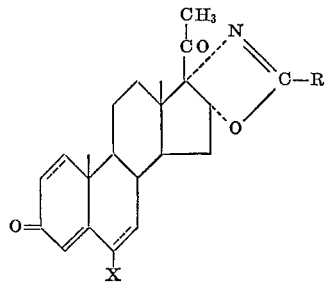

wherein R is a member of the class consisting of hydrogen, alkyl of 1 to 5 carbons and phenyl, X is a member of the class consisting of methyl, fluorine and chlorine, and when a Δ⁶ is present, also of hydrogen, the dotted lines representing optional additional bonds at positions 1 and/or 6.

2. A steroid as in claim 1 of the partial formula

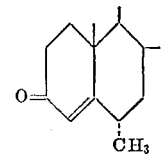

3. A steroid as in claim 1, of the partial formula

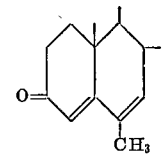

4. A steroid as in claim 1 of the partial formula

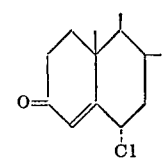

5. A steroid as in claim 1 of the partial formula

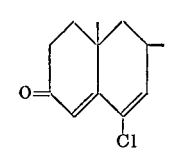

6. A compound as in claim 1, wherein the steroid is pregn - 4 - ene-3,20-dione-6α-methyl-[17α,16α-d]-2′-methyloxazoline.

7. A compound as in claim 1, wherein the steroid is pregna - 4,6 - diene - 3,20-dione-6-methyl-[17α,16α-d]-2'-methyloxazoline.

8. A compound as in claim 1, wherein the steroid is pregn - 4 - ene-3,20-dione-6α-chloro-[17α,16α-d]-2'-methyloxazoline.

9. A compound as in claim 1, wherein the steroid is pregna - 4,6 - diene - 3,20 - dione-6-chloro-[17α,16α-d]-2'-methyloxazoline.

10. A compound as in claim 1, wherein the steroid is pregn - 4 - ene-3,20-dione-6α-fluoro-[17α,16α-d]-2'-methyloxazoline.

11. A compound as in claim 1, wherein the steroid is pregna - 4,6 - diene - 3,20-dione-6-fluoro-[17α,16α-d]-2'-methyloxazoline.

12. A compound as in claim 1, wherein the steroid is pregn - 4 - ene - 3,20-dione-6α-chloro-[17α,16-d]-2'-phenyloxazoline.

13. A compound as in claim 1, wherein the steroid is pregna - 4,6 - diene - 3,20 - dione-6-chloro-[17α,16-d]-2'-phenyloxazoline.

References Cited

UNITED STATES PATENTS 3,019,239   1/1962   Ringold et al. _____ 260—397.3
3,413,286   11/1968  Nathansohn et al. __ 260—239.55

OTHER REFERENCES

Ringold et al., JACS 81, pp. 3485–86 (1959).
Knox et al., JACS 82, pp. 1230–32 (1960).
Burn et al. Tetrahedron 20, pp. 597–100 (1964).
Burn et al., Tetrahedron 21, pp. 1619–21 (1965).

HENRY A. FRENCH, Primary Examiner

U.S. Cl. X.R.

260—999